US012389405B2

(12) United States Patent
Lei

(10) Patent No.: US 12,389,405 B2
(45) Date of Patent: Aug. 12, 2025

(54) METHODS FOR DATA TRANSMISSION AND A TERMINAL DEVICE

(71) Applicant: SPREADTRUM SEMICONDUCTOR (NANJING) CO., LTD., Jiangsu (CN)

(72) Inventor: Reven Lei, Jiangsu (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 528 days.

(21) Appl. No.: 17/681,792

(22) Filed: Feb. 27, 2022

(65) Prior Publication Data

US 2022/0272692 A1 Aug. 25, 2022

Related U.S. Application Data

(63) Continuation of application No. PCT/CN2020/109109, filed on Aug. 14, 2020.

(30) Foreign Application Priority Data

Aug. 30, 2019 (CN) ........................ 201910815683.9

(51) Int. Cl.

*H04W 72/21* (2023.01)
*H04W 72/23* (2023.01)
*H04W 72/51* (2023.01)

(52) U.S. Cl.

CPC ........... *H04W 72/21* (2023.01); *H04W 72/23* (2023.01); *H04W 72/51* (2023.01)

(58) Field of Classification Search

CPC ... H04W 68/005; H04W 88/06; H04W 76/15; H04W 80/10; H04W 60/04; H04W 76/20; H04W 8/183; H04W 12/50; H04W 72/044; H04W 56/0045; H04W 72/21

See application file for complete search history.

(56) References Cited

U.S. PATENT DOCUMENTS

2019/0342912 A1* 11/2019 Priyanto ............. H04W 72/046
2021/0218495 A1* 7/2021 Bi ......................... H04W 72/23
2022/0264520 A1* 8/2022 Xu ...................... H04W 68/005
2022/0279588 A1* 9/2022 Mu .................. H04W 74/0833

FOREIGN PATENT DOCUMENTS

CN 108207020 A 6/2018
WO 2018145302 A1 8/2018
WO 2019015157 A1 1/2019

OTHER PUBLICATIONS

The International Search Report issued in corresponding International Application No. PCT/CN2020/109109, mailed Nov. 4, 2020.

OPPO :"Issues on Data Transmission in Inactive State", 3GPP TSG-RAN2#97 R2-1700963, Feb. 4, 2017 (Feb. 4, 2017); sections 2-5.

* cited by examiner

*Primary Examiner* — Iqbal Zaidi

(74) *Attorney, Agent, or Firm* — HAUPTMAN HAM, LLP

(57) ABSTRACT

The present disclosure relates to the technical field of communications, and in particular, to methods for data transmission and a terminal device. The method is implemented in a terminal device in a sleep state or an inactive state. The method includes: transmitting an uplink (UL) indication signal on an UL preconfigured resource unit, where the UL preconfigured resource unit is a preconfigured periodic UL transmission resource unit, and the UL indication signal includes an UL sequence or UL data.

16 Claims, 4 Drawing Sheets

TERMINAL DEVICE
ACCESS NETWORK DEVICE
301, TERMINAL DEVICE TRANSMIT AN UL INDICATION SIGNAL ON AN UL PRECONFIGURED RESOURCE UNIT CORRESPONDING TO AN UL INDICATION SIGNAL TRANSMISSION OCCASION
302, RECEIVE, ON THE UL PRECONFIGURED RESOURCE UNIT CORRESPONDING TO THE UL INDICATION SIGNAL TRANSMISSION OCCASION, THE UL INDICATION SIGNAL TRANSMITTED BY THE TERMINAL DEVICE

TERMINAL DEVICE
ACCESS NETWORK DEVICE
401, TERMINAL DEVICE TRANSMIT AN UL SEQUENCE ON AN UL INDICATION SIGNAL TRANSMISSION OCCASION WHEN UL DATA NEEDS TO BE TRANSMITTED ON THE UL INDICATION SIGNAL TRANSMISSION OCCASION
402, TRANSMIT DL INDICATION INFORMATION ON A DL TRANSMISSION BEAM AFTER RECEIVING THE UL SEQUENCE TRANSMITTED BY THE TERMINAL DEVICE ON THE UL INDICATION SIGNAL TRANSMISSION OCCASION
403, RECEIVE THE DL INDICATION INFORMATION TRANSMITTED ON THE DL TRANSMISSION BEAM
404, TRANSMIT THE UL DATA ON A GENERAL PRECONFIGURED RESOURCE IN A CURRENT PERIOD
405, RECEIVE THE UL DATA TRANSMITTED BY THE TERMINAL DEVICE ON THE GENERAL PRECONFIGURED RESOURCE IN THE CURRENT PERIOD

TRANSMITTING MODULE 910
FIG. 9
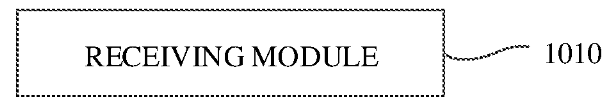
FIG. 10
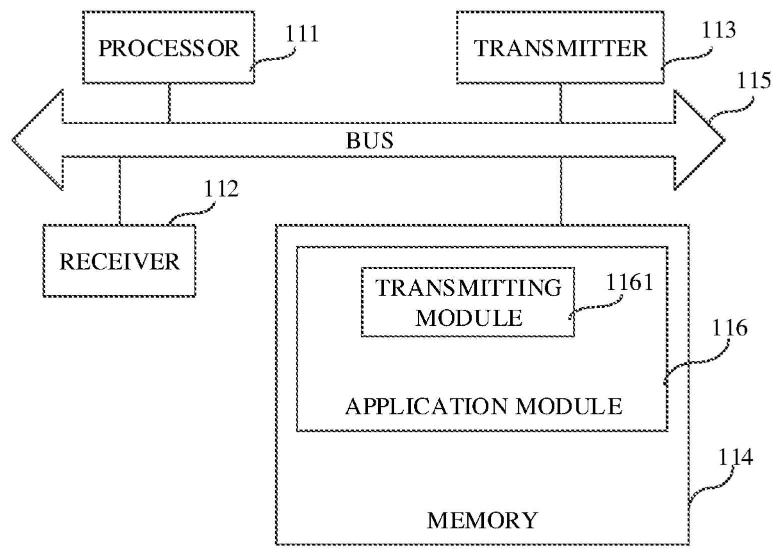
FIG. 11
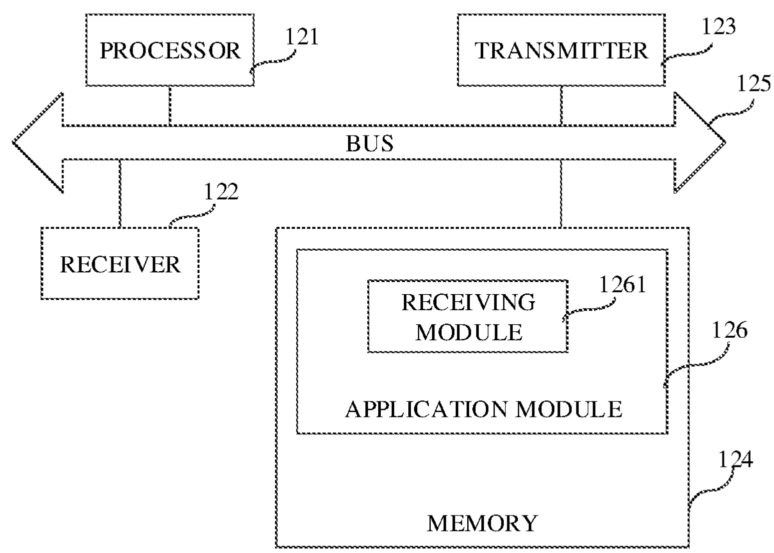
FIG. 12

METHODS FOR DATA TRANSMISSION AND A TERMINAL DEVICE

CROSS REFERENCE TO RELATED APPLICATION(S)

This application is a continuation of International Application No. PCT/CN2020/109109, filed on Aug. 14, 2020, which claims priority to Chinese Patent Application No. 201910815683.9, filed on Aug. 30, 2019, the disclosures of which are hereby incorporated by reference in their entireties.

TECHNICAL FIELD

The present disclosure relates to the technical field of communications, and in particular, to methods for data transmission and a terminal device.

BACKGROUND

In a 5th generation (5G) mobile communication system, user equipment (UE) usually transmits uplink (UL) data to an evolved node B (eNB) based on a scheduled transmission method.

When the UE is in a sleep state or an inactive state and has UL data to transmit, the UE needs to initiate a random access procedure to enter a connected state. After entering the connected state, the UE transmits an UL scheduling request (SR) to the eNB, and the eNB configures an UL grant for the UE according to the SR, where the UL grant is used to configure an UL transmission resource for the UE. When the UE correctly decodes and obtains the UL grant, the UE transmits the UL data to the eNB according to the UL transmission resource configured by the eNB.

However, in above-mentioned data transmission mechanism, an interaction process between the UE and the eNB is complicated, and the whole process takes a long time, resulting in low UL data transmission efficiency.

SUMMARY

According to an aspect of the present disclosure, a method for data transmission is provided. The method is implemented in a terminal device in a sleep state or an inactive state and includes: transmitting an uplink (UL) indication signal on an UL preconfigured resource unit, where the UL preconfigured resource unit is a preconfigured periodic UL transmission resource unit, and the UL indication signal includes an UL sequence or UL data.

According to another aspect of the present disclosure, a method for data transmission is provided. The method is implemented in an access network device and includes: receiving, on an UL preconfigured resource unit, an UL indication signal transmitted by a terminal device, where the terminal device is in a sleep state or an inactive state, the UL preconfigured resource unit is a preconfigured periodic UL transmission resource unit, and the UL indication signal includes an UL sequence or UL data.

According to another aspect of the present disclosure, a terminal device is provided. The terminal device is in a sleep state or an inactive state and includes a memory configured to store processor executable instructions, and a processor configured to: transmit an UL indication signal on an UL preconfigured resource unit, where the UL preconfigured resource unit is a preconfigured periodic UL transmission resource unit, and the UL indication signal includes an UL sequence or UL data.

BRIEF DESCRIPTION OF THE DRAWINGS

The drawings included in the specification and constituting a part of the specification together with the specification illustrate exemplary implementations, features, and aspects of the present disclosure, and are used to explain the principle of the present disclosure.

FIG. 9 is a schematic structural diagram illustrating an apparatus for data transmission provided in some implementations of the present disclosure.

FIG. 10 is a schematic structural diagram illustrating an apparatus for data transmission provided in some other implementations of the present disclosure.

FIG. 11 is a schematic structural diagram illustrating a terminal device provided in some exemplary implementations of the present disclosure.

FIG. 12 is a schematic structural diagram illustrating an access network device provided in some exemplary implementations of the present disclosure.

DETAILED DESCRIPTION

Figure 1:
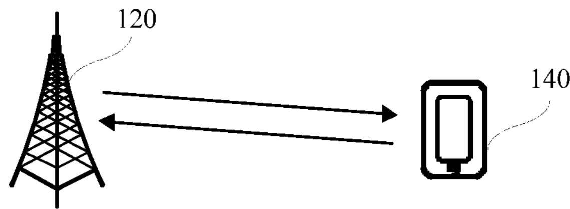
FIG. 1 is a schematic structural diagram illustrating a mobile communication system provided in some exemplary implementations of the present disclosure.

Hereinafter, various exemplary implementations, features, and aspects of the present disclosure will be described in detail with reference to the drawings. The same reference numbers in the drawings indicate elements with the same or similar functions. Although various aspects of implementations are illustrated in the drawings, unless otherwise noted, the drawings are not necessarily drawn to scale.

A specific word "exemplary" here means "serving as an example, implementation, or illustration". Any implementation described herein as "exemplary" need not be construed as being preferred to or better than other implementations.

In addition, to better illustrate the present disclosure, numerous specific details are given in the following detailed description. Those skilled in the art should understand that the present disclosure can also be implemented without certain specific details. In some instances, to highlight the subject matter of the present disclosure, methods, means, elements, and circuits well known to those skilled in the art have not been described in detail.

When user equipment (UE) is in a sleep state or an inactive state and has uplink (UL) data to transmit, the UE needs to initiate a random access procedure to enter a connected state. After entering the connected state, the UE transmits an UL scheduling request (SR) to an evolved nodeB (eNB), and the eNB configures an UL grant for the UE according to the SR, where the UL grant is used to configure an UL transmission resource for the UE. When the UE correctly decodes and obtains the UL grant, the UE transmits the UL data to the eNB according to the UL transmission resource configured by the eNB.

However, in above-mentioned data transmission mechanism, an interaction process between the UE and the eNB is complicated, and the whole process takes a long time, resulting in low UL data transmission efficiency.

In implementations of the present disclosure, a preconfigured periodic UL transmission resource unit (i.e., an UL preconfigured resource unit) is introduced when a terminal device is in a sleep state or an inactive state, so that the terminal device can directly transmit an UL indication signal on the UL preconfigured resource unit, where the UL indication signal includes an UL sequence (for example, a preamble) or UL data. In this way, a situation where the terminal device needs to initiate a random access procedure to enter a connected state is avoided, an interaction process between the terminal device and an access network device is simplified, signaling overhead and energy consumption of the terminal device are reduced, and UL data transmission efficiency is improved.

Referring to FIG. 1, FIG. 1 is a schematic structural diagram illustrating a mobile communication system provided in some exemplary implementations of the present disclosure. The mobile communication system may be a long-term evolution (LTE) system, a 5th generation (5G) system, which may also be referred to as a new radio (NR) system, or a next-generation mobile communication technology system of 5G, which is not limited herein.

Optionally, the mobile communication system is applicable to different network architectures, including but not limited to a relay network architecture, a dual-link architecture, a vehicle to everything (V2X) architecture, etc.

The mobile communication system includes an access network device 120 and a terminal device 140.

The access network device 120 may be a base station (BS) (or referred to as a base station device) and is a device deployed in a radio access network (RAN) to provide a wireless communication function. For example, a device for providing a base station function in a 2nd generation (2G) network includes a base transceiver station (BTS), a device for providing a base station function in a 3rd generation (3G) network includes a node B (NodeB), a device for providing a base station function in a 4th generation (4G) network includes an evolved nodeB (eNB), a device for providing a base station function in a wireless local area network (WLAN) is an access point (AP), and a device for providing a base station function in a 5G system is a next generation NodeB (gNB) or an next generation eNodeB (ng-eNB). The access network device 120 in implementations of the present disclosure also includes a device for providing a base station function in a new future communication system. The specific implementation of the access network device 120 is not limited herein. The access network device may also include a home eNB (HeNB), a relay, a pico base station, etc.

A base station controller is a device for managing a base station, such as a base station controller (BSC) in a 2G network, a radio network controller (RNC) in a 3G network, or a device for controlling and managing a base station in a new future communication system.

A network in implementations of the present disclosure is a communication network for providing a communication service for the terminal device 140, and includes a base station of a wireless access network, a base station controller of a wireless access network, and a core network side device.

The core network may be an evolved packet core (EPC), a 5G core network, or a new type of core network in a future communication system. The 5G core network includes a set of devices, and implements an access and mobility management function (AMF) for providing mobility management and other functions, a user plane function (UPF) for providing packet routing and forwarding, quality of service (QoS) management, and other functions, a session management function (SMF) for providing session management, internet protocol (IP) address assignment and management, and other functions. The EPC may include an mobility management entity (MME) for providing mobility management, gateway selection, and other functions, a serving gateway (S-GW) for providing packet forwarding and other functions, and a public data network (PDN) gateway (P-GW) for providing terminal address assignment, rate control, and other functions.

A wireless connection is established between the access network device 120 and the terminal device 140 through a wireless air interface. Optionally, the wireless air interface may be a wireless air interface based on a 5G standard, such as an NR wireless air interface, a wireless air interface based on a next-generation mobile communication network technology standard of 5G, or a wireless air interface based on a 4G standard, such as a wireless air interface of an LTE system. The access network device 120 may receive UL data transmitted by the terminal device 140 through the wireless connection.

The terminal device 140 may refer to a device that communicates data with the access network device 120. The terminal device 140 may communicate with one or more core networks via a radio access network. The terminal device 140 may be a UE, an access terminal device, a subscriber unit, a subscriber station, a mobile station, a mobile station (MS), a remote station, a remote terminal device, a mobile device, a user terminal device, terminal equipment, a wireless communication device, a user agent, or a user device in various forms. The terminal device 140 may also be a cellular phone, a cordless phone, a session initiation protocol (SIP) phone, a wireless local loop (WLL) station, a personal digital assistant (PDA), a wireless communication-enabled handheld device, a computing device, or another processing device connected to a wireless modem, an in-vehicle device, a wearable device, a terminal device in a future 5G network, a terminal device in a future evolved public land mobile network (PLMN), etc., which is not limited herein. The terminal device 140 may receive downlink (DL) data transmitted by the access network device 120 through the wireless connection with the access network device 120.

It should be noted that, when the mobile communication system illustrated in FIG. 1 adopts a 5G system or a next-generation mobile communication technology system of 5G, each network element above may have a different name in the 5G system or the next-generation mobile communication technology system of 5G, but may have a same or similar function, which is not limited herein.

Another point to be noted is that, the mobile communication system illustrated in FIG. 1 may include multiple access network devices 120 and/or multiple terminal devices 140. In FIG. 1, one access network device 120 and one terminal device 140 are illustrated as an example for illustration, which is not limited herein.

Figure 2:
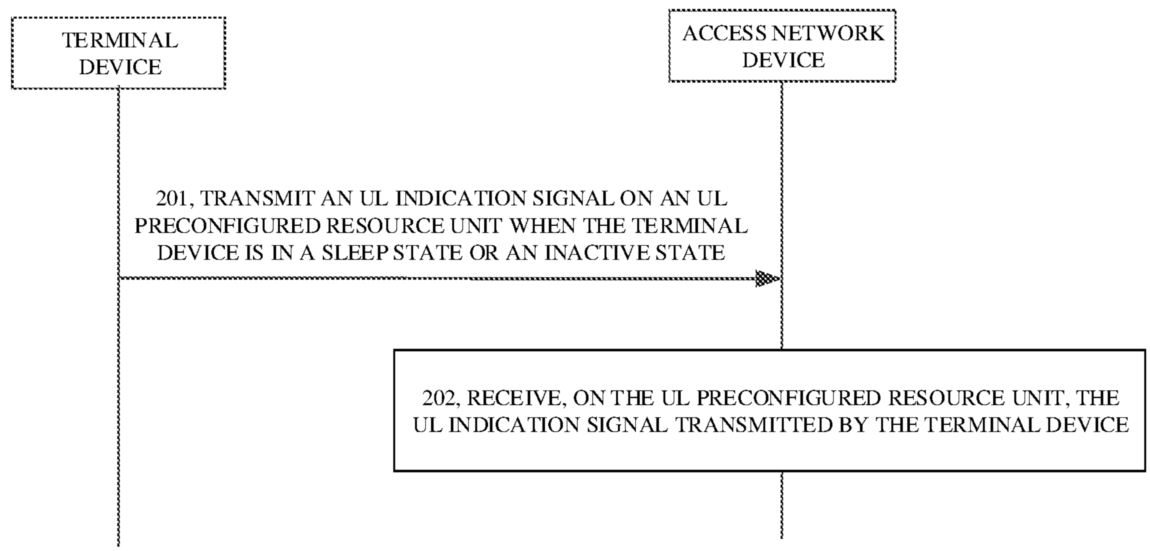
FIG. 2 is a flowchart illustrating a method for data transmission provided in some exemplary implementations of the present disclosure.

Referring to FIG. 2, FIG. 2 is a flowchart illustrating a method for data transmission provided in some exemplary implementations of the present disclosure. In this implementation, the method is implemented in the mobile communication system illustrated in FIG. 1 as an example for illustration. The method includes the following steps.

At S201, a terminal device transmits an UL indication signal on an UL preconfigured resource unit when the terminal device is in a sleep state or an inactive state.

The state of the terminal device is a sleep state, an inactive state, or a connected state.

Optionally, the connected state is a state where there is a radio resource control (RRC) connection between the terminal device and an access network device. The sleep state (or referred to as an idle state) is a state where there is no RRC connection between the terminal device and the access network device, and context information of the terminal device is stored or not stored in the terminal device and the access network device. The inactive state is a state different from the idle state and the connected state. The terminal device in the connected state is triggered by a mobile communication network to enter the inactive state, and at this time, the terminal device and the mobile communication network both store the context information of the terminal device in the connected state before the inactive state.

Optionally, the terminal device transmits the UL indication signal on the UL preconfigured resource unit when the terminal device is in the sleep state or the inactive state and has UL data to transmit.

The UL preconfigured resource unit is a preconfigured periodic UL transmission resource unit, and the UL indication signal includes an UL sequence or UL data.

At S202, the access network device receives, on the UL preconfigured resource unit, the UL indication signal transmitted by the terminal device.

Correspondingly, the access network device receives, on the UL preconfigured resource unit, the UL indication signal transmitted by the terminal device. The UL preconfigured resource unit is the preconfigured periodic UL transmission resource unit, and the UL indication signal includes the UL sequence or the UL data.

Optionally, before the terminal device transmits the UL indication signal on the UL preconfigured resource unit, the access network device preconfigures the UL preconfigured resource unit for the terminal device, and the terminal device receives the UL preconfigured resource unit preconfigured by the access network device.

To sum up, in implementations of the present disclosure, a preconfigured periodic UL transmission resource unit (i.e., an UL preconfigured resource unit) is introduced when a terminal device is in a sleep state or an inactive state, so that the terminal device can directly transmit an UL indication signal on the UL preconfigured resource unit, and correspondingly, an access network device receives, on the UL preconfigured resource unit, the UL indication signal transmitted by the terminal device. In this way, a situation where the terminal device needs to initiate a random access procedure to enter a connected state is avoided, an interaction process between the terminal device and an access network device is simplified, signaling overhead and energy consumption of the terminal device are reduced, and UL data transmission efficiency is improved.

Figure 3:
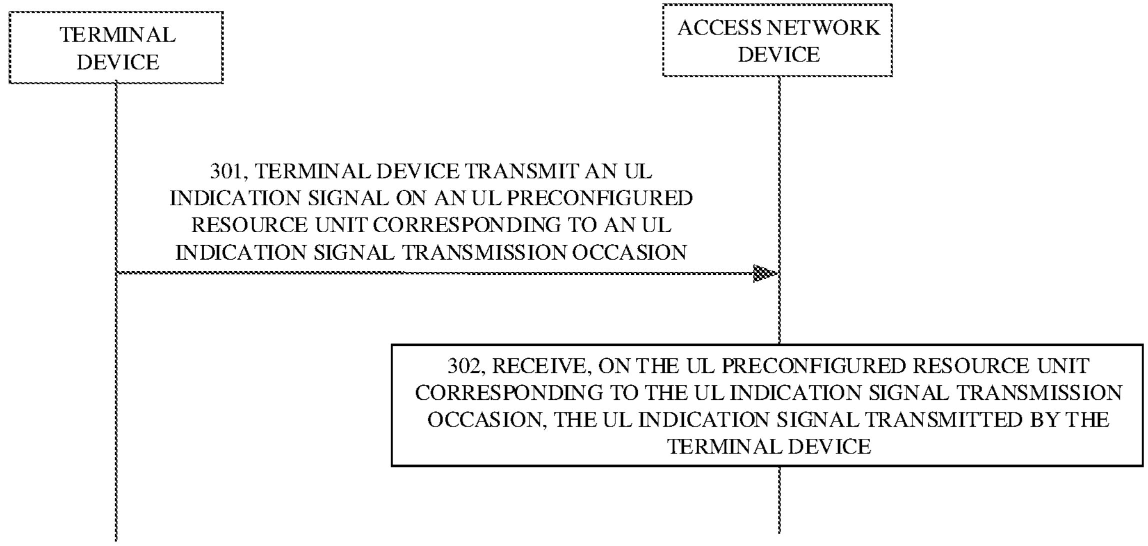
FIG. 3 is a flowchart illustrating a method for data transmission provided in some other exemplary implementations of the present disclosure.

Referring to FIG. 3, FIG. 3 is a flowchart illustrating a method for data transmission provided in some other exemplary implementations of the present disclosure. In this implementation, the method is implemented in the terminal device illustrated in FIG. 1 as an example for illustration. The method includes the following steps.

At S301, a terminal device transmits an UL indication signal on an UL preconfigured resource unit corresponding to an UL indication signal transmission occasion.

Optionally, before the terminal device transmits the UL indication signal on the UL preconfigured resource unit corresponding to the UL indication signal transmission occasion, the access network device preconfigures the UL indication signal transmission occasion for the terminal device, and correspondingly, the terminal device receives the UL indication signal transmission occasion preconfigured by the access network device. The UL indication signal transmission occasion is periodic and indicates a transmission occasion for transmitting the UL indication signal.

Optionally, the UL indication signal transmission occasion includes multiple UL preconfigured resource units.

In a possible implementation, only the UL sequence can be transmitted on each UL preconfigured resource unit among the multiple UL preconfigured resource units. In another possible implementation, both the UL sequence and the UL data can be transmitted on each UL preconfigured resource unit among the multiple UL preconfigured resource units.

The terminal device can transmit the UL indication signal on the UL preconfigured resource unit corresponding to the UL indication signal transmission occasion, which includes but is limited to following possible implementations.

In a possible implementation, the terminal device transmits the UL data on the specific UL preconfigured resource unit corresponding to the UL indication signal transmission occasion when the UL data needs to be transmitted on the UL indication signal transmission occasion.

Optionally, the UL indication signal transmission occasion includes multiple UL preconfigured resource units, and the specific UL preconfigured resource unit corresponding to the UL indication signal transmission occasion includes at least one of the multiple UL preconfigured resource units.

The specific UL preconfigured resource unit corresponding to the UL indication signal transmission occasion may be preconfigured or predefined, which is not limited herein.

In another possible implementation, the terminal device transmits the UL sequence on the UL indication signal transmission occasion when the UL data needs to be transmitted on the UL indication signal transmission occasion, receives DL indication information, and transmits the UL data on a general preconfigured resource in a current period.

Optionally, the terminal device transmits the UL sequence on the specific UL preconfigured resource unit corresponding to the UL indication signal transmission occasion when the UL data needs to be transmitted on the UL indication signal transmission occasion.

Optionally, a period of the UL indication signal transmission occasion is (N+1) times a period of the general preconfigured resource, that is, the terminal device transmits the UL indication signal on the UL preconfigured resource unit and N general preconfigured resources may be activated, where N is a positive integer.

Optionally, the general preconfigured resource in the current period includes at least one general preconfigured resource in a period of the UL indication signal transmission occasion on which the terminal device transmits the UL sequence.

Optionally, the terminal device transmits the UL data on the general preconfigured resources in the current period, that is, the terminal device selects at least one general preconfigured resource in the period of the UL indication signal transmission occasion, and transmits the UL data on the at least one general preconfigured resource.

The UL indication signal transmission occasion is associated with multiple general preconfigured resources. Optionally, the UL indication signal transmission occasion is a start of an UL preconfigured resource window, and the UL preconfigured resource window includes multiple general preconfigured resources.

At S302, the access network device receives, on the UL preconfigured resource unit corresponding to the UL indication signal transmission occasion, the UL indication signal transmitted by the terminal device.

Correspondingly, the access network device receives, on the specific UL preconfigured resource unit corresponding to the UL indication signal transmission occasion, the UL data transmitted by the terminal device. Alternatively, the access network device receives, on the UL indication signal transmission occasion, the UL sequence transmitted by the terminal device, transmits DL indication information, and receives, on a general preconfigured resource in a current period, the UL data transmitted by the terminal device.

The UL indication signal transmission occasion is preconfigured by the access network device.

Optionally, the access network device skips responding after receiving, on the UL indication signal transmission occasion, the UL sequence transmitted by the terminal device.

Correspondingly, the terminal device transmits a random access request and switches a device state of the terminal device to a connected state, in a case where no DL indication information is received and the UL data needs to be transmitted, and transmits the UL data in the connected state.

Optionally, the terminal device receives no DL indication information, which indicates that the general preconfigured resource in the current period cannot be used to transmit the UL data of the terminal device, and the terminal device needs to fall back to a traditional transmission mechanism, that is, fall back to a random access procedure, to transmit the UL data in the current period.

After the terminal device transmits the random access request to the access network device, the access network device receives the random access request. After receiving the random access request transmitted by the terminal device, the access network device receives the UL data transmitted by the terminal device in the connected state.

To sum up, in implementations of the present disclosure, the terminal device falls back to the random access procedure when the terminal device receives no response from the access network device after transmitting the UL indication signal. That is, when the terminal device has UL data to transmit, it transmits the random access request, switches its device state to the connected state, and transmits the UL data in the connected state. In this way, the general preconfigured resource in the current period can be vacated for other scheduling by the access network device, thereby effectively solves a resource overhead problem caused by the UL preconfigured resource unit.

Figure 4:
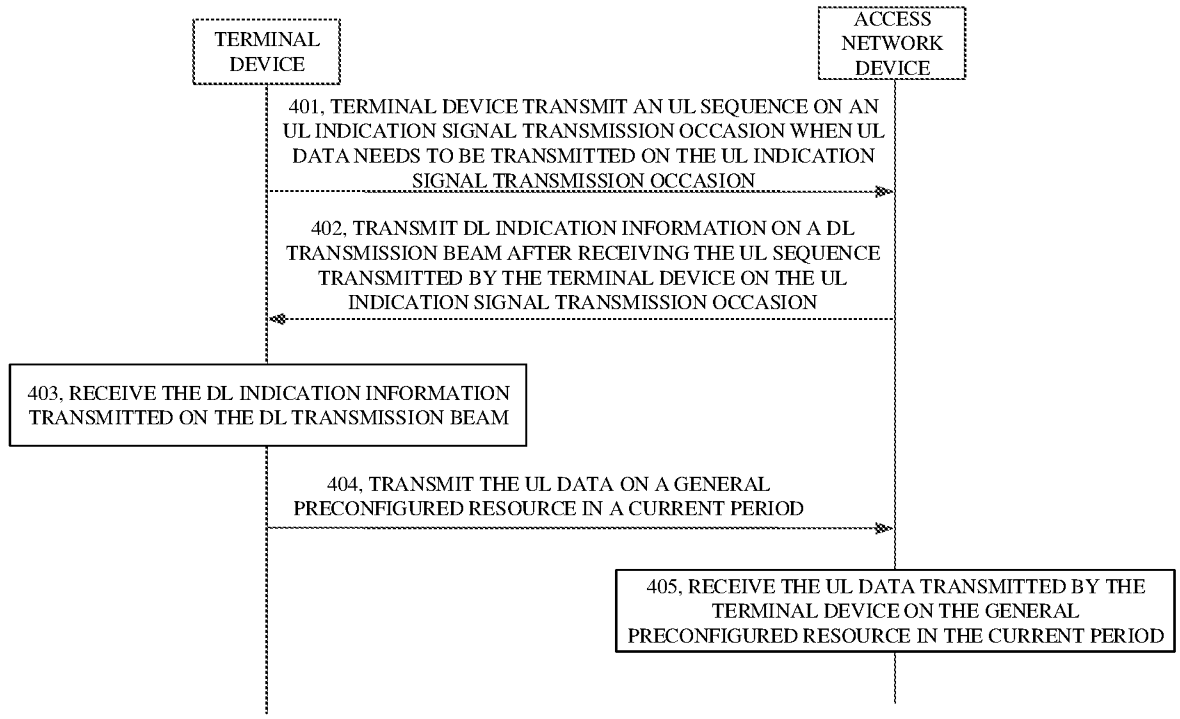
FIG. 4 is a flowchart illustrating a method for data transmission provided in some other exemplary implementations of the present disclosure.

It should be noted that, due to a possible problem of UL and DL beam alignment, in implementations of the present disclosure, each UL preconfigured resource unit is associated with one or more DL transmission beams, so that the access network device can determine a DL transmission beam according to the position of the UL preconfigured resource unit corresponding to the UL indication signal. Referring to FIG. 4, FIG. 4 is a flowchart illustrating a method for data transmission provided in some other exemplary implementations of the present disclosure. In this implementation, the method is implemented in the terminal device illustrated in FIG. 4 as an example for illustration. The method includes the following steps.

At S401, a terminal device transmits an UL sequence on an UL indication signal transmission occasion when UL data needs to be transmitted on the UL indication signal transmission occasion.

It should be noted that, the terminal device may transmit the UL sequence on the UL indication signal transmission occasion as with reference to related details in above implementations when the UL data needs to be transmitted on the UL indication signal transmission occasion, which will not be repeated herein.

At S402, an access network device transmits DL indication information on a DL transmission beam after receiving the UL sequence transmitted by the terminal device on the UL indication signal transmission occasion.

Optionally, the UL indication signal transmission occasion includes multiple UL preconfigured resource units, and each UL preconfigured resource unit among the multiple UL preconfigured resource units is associated with one or more DL transmission beams.

The access network device stores an association relationship between UL preconfigured resource units and DL transmission beams.

Optionally, the access network device determines one or more DL transmission beams corresponding to the UL indication signal transmission occasion according to the stored association relationship after the UL sequence transmitted by the terminal device on the UL indication signal transmission occasion is received. The access network device transmits the DL indication information on the one or more DL transmission beams.

After receiving the UL sequence, the access network device transmits the DL indication information on the DL transmission beam and perform the operation at S403. Alternatively, the access network device skips responding after receiving the UL sequence, and the terminal device receives no response from the access network device and falls back to the random access procedure.

At S403, the terminal device receives the DL indication information transmitted on the DL transmission beam.

The terminal device receives the DL indication information transmitted by the access network device on the DL transmission beam after the access network device transmits the DL indication information on the DL transmission beam.

Optionally, the terminal device receives the DL indication information transmitted on one or more DL transmission beams.

At S404, the terminal device transmits the UL data on a general preconfigured resource in a current period.

Optionally, the terminal device selects at least one general preconfigured resource in the current period, and transmits the UL data on the selected at least one general preconfigured resource.

Optionally, the current period is a period of the UL indication signal transmission occasion on which the terminal device transmits the UL sequence. The period of the UL indication signal transmission occasion is (N+1) times a period of the general preconfigured resource, that is, the terminal device transmits the UL indication signal on the UL preconfigured resource unit and N general preconfigured resources may be activated, where N is a positive integer.

At S405, the access network device receives the UL data transmitted by the terminal device on the general preconfigured resource in the current period.

After the terminal device transmits the UL data on the general preconfigured resource in the current period, correspondingly, the access network device receives the UL data transmitted by the terminal device on the general preconfigured resource.

Figure 5:
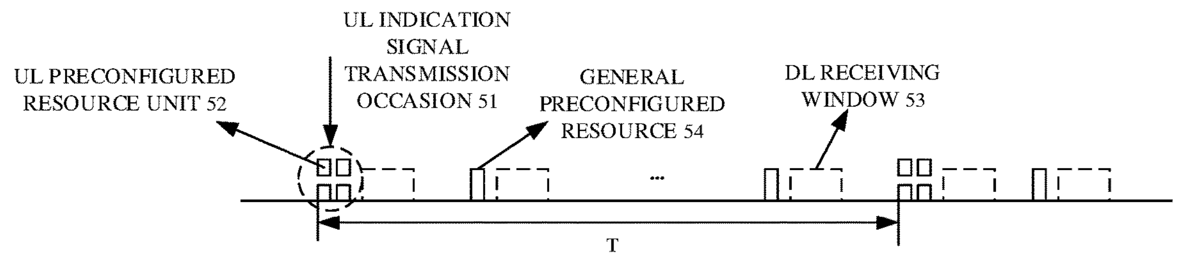
FIGS. 5 to 8 are schematic diagrams illustrating a principle of a method for data transmission provided in some exemplary implementations of the present disclosure.

In an illustrative example, as illustrated in FIG. 5, a preconfigured periodic UL indication signal transmission occasion (e.g., with a period of T) is introduced, that is, the terminal device transmits an UL sequence on a specific UL indication signal transmission occasion 51. In addition, due to a problem of UL and DL beam alignment, there are multiple UL preconfigured resource units 52 in the UL indication signal transmission occasion 51, and each UL preconfigured resource unit 52 can only be used to transmit an UL sequence and is associated with one or more DL transmission beams of the access network device. The access network device may determine a DL transmission beam according to the position of the UL preconfigured resource unit 52 corresponding to the UL indication signal.

The access network device may transmit a response to the terminal device after receiving the UL indication signal transmitted by the terminal device. The terminal device can transmit UL data with a general preconfigured resource 54 in a current period T only after receiving the response transmitted by the access network device in a DL receiving window 53. If the terminal device receives no response from the access network device after transmitting the indication signal, the UL preconfigured resource in the current period T cannot be used to transmit the UL data of the terminal device, and the terminal device needs to fall back to a traditional data transmission mechanism, that is, fall back to a random access procedure, to transmit the UL data in the current period.

Figure 6:
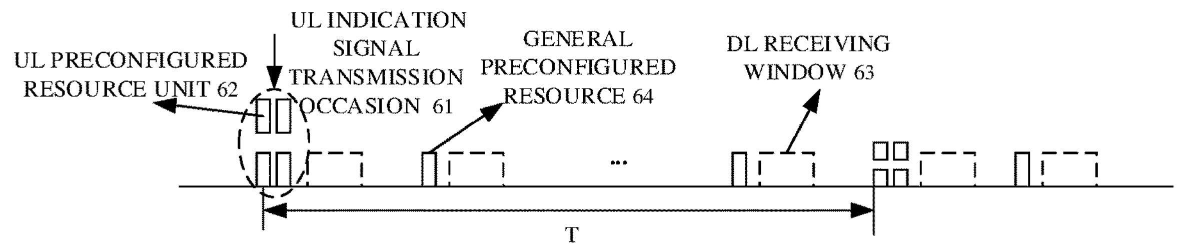

In an illustrative example, as illustrated in FIG. 6, a preconfigured periodic UL indication signal transmission occasion 61 (e.g., with a period of T) is introduced, that is, the terminal device transmits an UL sequence or UL data on a specific UL indication signal transmission occasion 61. In addition, due to a problem of UL and DL beam alignment, there are multiple UL preconfigured resource units 62 in each UL indication signal transmission occasion 61, and each UL preconfigured resource unit 62 can be used to transmit an UL sequence and UL data. When the terminal device has UL data to transmit on the UL indication signal transmission occasion 61, the terminal device may select a specific UL preconfigured resource unit 62 in the UL indication signal transmission occasion 61 to transmit the UL data. Each UL preconfigured resource unit 62 is associated with one or more DL transmission beams of the access network device. The access network device may determine a DL transmission beam according to the position of the UL preconfigured resource unit 62 corresponding to the UL indication signal.

The access network device may transmit a response to the terminal device after receiving the UL indication signal transmitted by the terminal device. The terminal device can transmit UL data with a general preconfigured resource 64 in a current period T only after receiving the response transmitted by the access network device in a DL receiving window 63. If the terminal device receives no response from the access network device after transmitting the indication signal, the UL preconfigured resource in the current period T cannot be used to transmit the UL data of the terminal device, and the terminal device needs to fall back to a traditional data transmission mechanism, that is, fall back to a random access procedure, to transmit the UL data in the current period.

Figure 7:
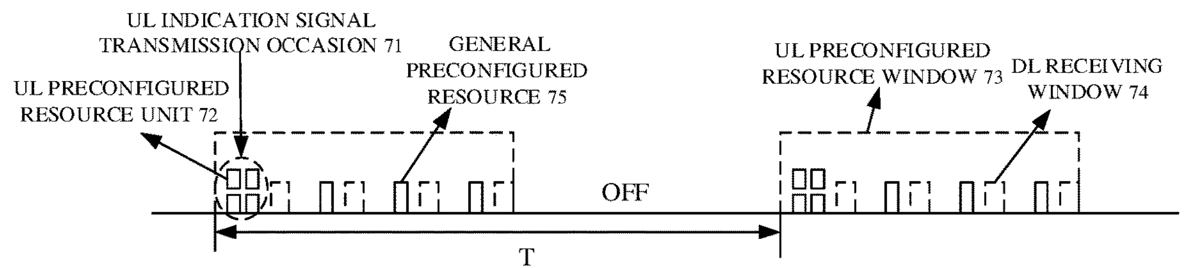

In an illustrative example, as illustrated in FIG. 7, there are multiple general preconfigured resources 75 in an UL preconfigured resource window 73, and the UL preconfigured resource window 73 has a period of T. A start of each UL preconfigured resource window 73 is an UL indication signal transmission occasion 71, that is, the terminal device transmits an UL sequence on a specific UL indication signal transmission occasion 71. In addition, due to a problem of UL and DL beam alignment, there are multiple UL preconfigured resource units 72 in each UL indication signal transmission occasion 71, and each UL preconfigured resource unit 72 can only be used to transmit an UL sequence and is associated with one or more DL transmission beams of the access network device. The access network device may determine a DL transmission beam according to the position of the UL preconfigured resource unit 72 corresponding to the UL indication signal.

The access network device may transmit a response to the terminal device after receiving the UL indication signal transmitted by the terminal device. The terminal device can transmit UL data with a general preconfigured resource 75 in a current period T only after receiving the response transmitted by the access network device in a DL receiving window 74. If the terminal device receives no response from the access network device after transmitting the indication signal, the UL preconfigured resource in the current period T cannot be used to transmit the UL data of the terminal device, and the terminal device needs to fall back to a traditional data transmission mechanism, that is, fall back to a random access procedure, to transmit the UL data in the current period.

Figure 8:
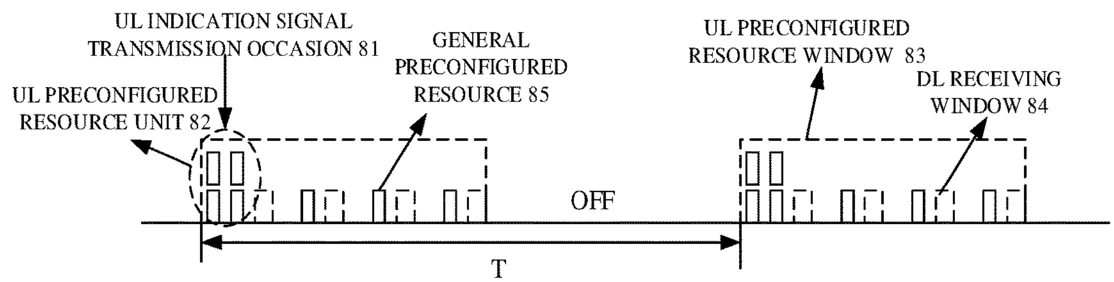

In an illustrative example, as illustrated in FIG. 8, there are multiple general preconfigured resources 85 in an UL preconfigured resource window 83, and the UL preconfigured resource window 83 has a period of T. A start of each UL preconfigured resource window 83 is an UL indication signal transmission occasion 81, that is, the terminal device transmits an UL sequence or UL data on a specific UL indication signal transmission occasion 81. In addition, due to a problem of UL and DL beam alignment, there are multiple UL preconfigured resource units 82 in each UL indication signal transmission occasion 81, and each UL preconfigured resource unit 82 can be used to transmit an UL sequence and UL data. When the terminal device has UL data to transmit on the UL indication signal transmission occasion 81, the terminal device may select a specific UL preconfigured resource unit 82 in the UL indication signal transmission occasion 81 to transmit the UL data. Each UL preconfigured transmission resource unit is associated with one or more DL transmission beams of the access network device. The access network device may determine a DL transmission beam according to the position of the UL preconfigured resource unit 82 corresponding to the UL indication signal.

The access network device may transmit a response to the terminal device after receiving the UL indication signal transmitted by the terminal device. The terminal device can transmit UL data with a general preconfigured resource 85 in a current period T only after receiving the response transmitted by the access network device in a DL receiving window 84. If the terminal device receives no response from the access network device after transmitting the indication signal, the UL preconfigured resource in the current period T cannot be used to transmit the UL data of the terminal device, and the terminal device needs to fall back to a traditional data transmission mechanism, that is, fall back to a random access procedure, to transmit the UL data in the current period.

To sum up, due to a possible problem of UL and DL beam alignment, in implementations of the present disclosure, each UL preconfigured resource unit is associated with one or more DL transmission beams, so that the access network device can determine a DL transmission beam according to the position of the UL preconfigured resource unit corresponding to the UL indication signal. As such, the terminal device can receive DL indication information transmitted on the DL transmission beam, and UL and DL beam alignment can be ensured.

The following are apparatus implementations according to implementations of the present disclosure. For parts not described in detail in the apparatus implementations, reference may be made to technical details disclosed in foregoing method implementations.

Referring to FIG. 9, FIG. 9 is a schematic structural diagram illustrating an apparatus for data transmission provided in some implementations of the present disclosure. The apparatus for data transmission can be implemented as all or a part of a terminal device through software, hardware, or a combination thereof. The terminal device is in a sleep state or an inactive state. The apparatus for data transmission includes a transmitting module 910 configured to transmit an UL indication signal on an UL preconfigured resource unit, where the UL preconfigured resource unit is a preconfigured periodic UL transmission resource unit, and the UL indication signal includes an UL sequence or UL data.

In a possible implementation, the transmitting module 910 is further configured to transmit the UL indication signal on the UL preconfigured resource unit corresponding to an UL indication signal transmission occasion.

In another possible implementation, the transmitting module 910 is further configured to transmit the UL data on the specific UL preconfigured resource unit corresponding to the UL indication signal transmission occasion when the UL data needs to be transmitted on the UL indication signal transmission occasion.

In another possible implementation, the transmitting module 910 is further configured to transmit the UL sequence on the UL indication signal transmission occasion when the UL data needs to be transmitted on the UL indication signal transmission occasion. The apparatus further includes a receiving module. The receiving module is configured to receive DL indication information. The transmitting module 910 is further configured to transmit the UL data on a general preconfigured resource in a current period.

In another possible implementation, a period of the UL indication signal transmission occasion is (N+1) times a period of the general preconfigured resource, and N is a positive integer.

In another possible implementation, the UL preconfigured resource unit is associated with one or more DL transmission beams, and the receiving module is further configured to receive the DL indication information transmitted on the one or more DL transmission beams.

In another possible implementation, the apparatus further includes a processing module. The processing module is configured to transmit a random access request and switch a device state of the terminal device to a connected state, in a case where no DL indication information is received and the UL data needs to be transmitted. The transmitting module 910 is further configured to transmit the UL data in the connected state.

In another possible implementation, the apparatus further includes a receiving module. The receiving module is configured to receive the UL indication signal transmission occasion preconfigured, where the UL indication signal transmission occasion is periodic and indicates a transmission occasion for transmitting the UL indication signal.

In another possible implementation, the UL indication signal transmission occasion includes multiple UL preconfigured resource units.

In another possible implementation, the UL indication signal transmission occasion is a start of an UL preconfigured resource window, and the UL preconfigured resource window includes multiple general preconfigured resources.

It should be noted that, when the apparatus provided in the above embodiments realizes its functions, the division of the above functional modules is used as only an example for illustration. In practical applications, the above functions can be allocated to be completed by different functional modules according to actual needs, i.e., the content structure of the apparatus is divided into different functional modules to complete all or part of the functions described above.

The specific manners for performing operations of each module in the apparatus in the foregoing embodiments have been described in detail in the embodiments related to the method, and detailed description will not be given here.

Referring to FIG. 10, FIG. 10 is a schematic structural diagram illustrating an apparatus for data transmission provided some another implementations of the present disclosure. The apparatus for data transmission can be implemented as all or a part of an access network device through software, hardware, or a combination thereof. The apparatus for data transmission includes a receiving module 1010 configured to receive, on an UL preconfigured resource unit, an UL indication signal transmitted by a terminal device, where the terminal device is in a sleep state or an inactive state, the UL preconfigured resource unit is a preconfigured periodic UL transmission resource unit, and the UL indication signal includes an UL sequence or UL data.

In a possible implementation, the receiving module 1010 is further configured to receive, on the UL preconfigured resource unit corresponding to an UL indication signal transmission occasion, the UL indication signal transmitted by the terminal device.

In another possible implementation, the receiving module 1010 is further configured to receive, on the specific UL preconfigured resource unit corresponding to the UL indication signal transmission occasion, the UL data transmitted by the terminal device.

In another possible implementation, the receiving module 1010 is further configured to receive, on the UL indication signal transmission occasion, the UL sequence transmitted by the terminal device. The apparatus further includes a transmitting module. The transmitting module is configured to transmit DL indication information. The receiving module 1010 is further configured to receive, on a general preconfigured resource in a current period, the UL data transmitted by the terminal device.

In another possible implementation, a period of the UL indication signal transmission occasion is (N+1) times a period of the general preconfigured resource, and N is a positive integer.

In another possible implementation, the UL preconfigured resource unit is associated with one or more DL transmission beams, and the transmitting module is further configured to transmit the DL indication information on the one or more DL transmission beams.

In another possible implementation, the apparatus further includes a processing module. The processing module is configured to skip responding after receiving, on the UL indication signal transmission occasion, the UL sequence transmitted by the terminal device. The receiving module 1010 is further configured to receive the UL data transmitted by the terminal device in a connected state after receiving a random access request transmitted by the terminal device.

In another possible implementation, the apparatus further includes a transmitting module. The transmitting module is configured to transmit the UL indication signal transmission occasion preconfigured, where the UL indication signal transmission occasion is periodic and indicates a transmission occasion for transmitting the UL indication signal.

In another possible implementation, the UL indication signal transmission occasion includes multiple UL preconfigured resource units.

In another possible implementation, the UL indication signal transmission occasion is a start of an UL preconfigured resource window, and the UL preconfigured resource window includes multiple general preconfigured resources.

It should be noted that, when the apparatus provided in the above embodiments realizes its functions, the division of the above functional modules is used as only an example for illustration. In practical applications, the above functions can be allocated to be completed by different functional modules according to actual needs, i.e., the content structure of the apparatus is divided into different functional modules to complete all or part of the functions described above.

The specific manners for performing operations of each module in the apparatus in the foregoing embodiments have been described in detail in the embodiments related to the method, and detailed description will not be given here.

Referring to FIG. 11, FIG. 11 is a schematic structural diagram illustrating a terminal device provided in some exemplary implementations of the present disclosure. The terminal device may be the terminal device 140 in the mobile communication system illustrated in FIG. 1. In this implementation, the terminal device is taken as a UE in an LTE system or a 5G system as an example for illustration. The terminal device includes a processor 111, a receiver 112, a transmitter 113, a memory 114, and a bus 115. The memory 114 is connected to the processor 111 through the bus 115.

The processor 111 includes one or more processing cores, and the processor 111 executes various functional applications and information processing by running software programs and modules.

The receiver 112 and the transmitter 113 may be implemented as a communication component, which may be a communication chip, and the communication chip may include a receiving module, a transmitting module, a modulation and demodulation module, etc., for modulating and/or demodulating information, and receiving or transmitting information via wireless signals.

The memory 114 may be configured to store instructions executable by processor 111.

The memory 114 may store the application module 116 described in at least one function. The application module 116 may include a transmitting module 1161.

The processor 111 is configured to implement the transmitting module 1161 to realize functions related to transmitting operations performed by the terminal device in above method implementations.

Additionally, the memory 114 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk, or an optical disk.

Referring to FIG. 12, FIG. 12 is a schematic structural diagram illustrating an access network device provided in some exemplary implementations of the present disclosure. The access network device may be the access network device 120 in an implementation environment illustrated in FIG. 1. In this implementation, the access network device is taken as an eNB in an LTE system or a gNB in a 5G system as an example for illustration. The access network device includes a processor 121, a receiver 122, a transmitter 123, a memory 124, and a bus 125. The memory 124 is connected to the processor 121 through the bus 125.

The processor 121 includes one or more processing cores, and the processor 121 executes various functional applications and information processing by running software programs and modules.

The receiver 122 and the transmitter 123 may be implemented as a communication component, which may be a communication chip, and the communication chip may include a receiving module, a transmitting module, a modulation and demodulation module, etc., for modulating and demodulating the information, and receiving or transmitting information via wireless signals.

The memory 124 may be configured to store instructions executable by processor 121.

The memory 124 may store the application module 126 described in at least one function. The application module 126 may include a receiving module 1261.

The processor 121 is configured to implement the receiving module 1261 to realize functions related to receiving operations performed by the access network device in above method implementations.

Additionally, the memory 124 may be implemented by any type of volatile or non-volatile storage device or a combination thereof, such as a SRAM, an EEPROM, an EPROM, a PROM, a ROM, a magnetic memory, a flash memory, a magnetic disk, or an optical disk.

A system for data transmission is also provided in implementations of the present disclosure. The system includes a terminal device and an access network device.

In a possible implementation, the terminal device includes the apparatus for data transmission provided in the FIG. 9, and the access network device includes the apparatus for data transmission provided in FIG. 10.

In another possible implementation, the terminal device includes the terminal device provided in FIG. 11, and the access network device includes the access network device provided in FIG. 12.

The present disclosure may be a system, a method, and/or a computer program product. The computer program product may include a computer readable storage medium having computer readable program instructions thereon for enabling a processor to implement aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer readable storage medium include: a portable computer diskette, a hard disk, a random access memory (RAM), an ROM, an EPROM (or a flash memory), a SRAM, a portable compact disk read-only memory (CD-ROM), a digital versatile disc (DVD), a memory stick, a floppy disk, a mechanically encoded device such as punch-cards or raised structure in a groove having instructions stored thereon, and any suitable combination thereof. A computer readable storage medium, as used herein, is not to be construed as being transitory signals per se, such as radio waves or other freely propagating electromagnetic waves, electromagnetic waves propagating by means of a wave-guide or other transmission media (e.g., light pulses passing through a fiber-optic cable), or electrical signals transmitted by means of a wire.

Computer-readable program instructions described herein may be downloaded to respective computing/processing devices from the computer readable storage medium or to an external computer or external storage device by means of a network, for example, the Internet, a local area network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer readable program instructions may be executed completely on a user computer, executed partially on the user computer, executed as an independent software package, executed partially on the user computer and partially on a remote computer, or executed completely on the remote computer or server. In a scenario involving the remote computer, the remote computer may be connected to the user computer by means of any type of network, including a LAN or a wide area network (WAN), or the connection may be made to an external computer (for example, connecting by using an Internet service provider by means of the Internet). In some implementations, electronic circuitry including, for example, programmable logic circuitry, the FGPAs, or programmable logic arrays (PLAs) may execute the computer readable program instructions by utilizing state information of the computer readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the implementations of the present disclosure. It should be understood that, each block of the flowcharts and/or block diagrams, and combinations of the blocks in the flowcharts and/or block diagrams may be implemented by the computer readable program instructions.

These computer readable program instructions may be provided to a processor of a general-purpose computer, special-purpose computer, or other programmable data processing apparatus to produce a machine, such that the instructions, which execute by means of the processor of the computer or other programmable data processing apparatuses, create means for executing the functions/actions specified in one or more blocks of the flowcharts and/or block diagrams. These computer readable program instructions may also be stored in the computer readable storage medium, the instructions enable the computer, the programmable data processing apparatus, and/or other devices to function in a particular manner, so that the computer readable medium having instructions stored therein includes an article of manufacture including instructions which implement the aspects of the functions/actions specified in one or more blocks of the flowcharts and/or block diagrams.

The computer readable program instructions may also be loaded onto a computer, other programmable data processing apparatuses, or other devices to cause a series of operational steps to be performed on the computer, other programmable apparatuses or other devices to produce a computer implemented process, so that the instructions which execute on the computer, other programmable apparatuses or other devices implement the functions/actions specified in one or more blocks of the flowcharts and/or block diagrams.

The flowcharts and block diagrams in the accompanying drawings illustrate the architecture, functionality, and operations of possible implementations of systems, methods, and computer program products according to multiple implementations of the present disclosure. In this regard, each block in the flowchart or block diagram may represent a module, program segment, or portion of instruction, which includes one or more executable instructions for executing the specified logical function. In some alternative implementations, the functions noted in the block may also occur out of the order noted in the accompanying drawings. For example, two blocks illustrated in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or actions or implemented by combinations of special purpose hardware and computer instructions.

The descriptions of the implementations of the present disclosure have been presented for purposes of illustration, but are not intended to be exhaustive or limited to the implementations disclosed. Many modifications and variations will be apparent to persons of ordinary skill in the art without departing from the scope and spirit of the described implementations. The terminology used herein was chosen to best explain the principles of the implementations, the practical application or technical improvement over technologies found in the marketplace, or to enable other persons of ordinary skill in the art to understand the implementations disclosed herein.

What is claimed is:

1. A method for data transmission, being implemented in a terminal device in a sleep state or an inactive state, and the method comprising:

transmitting an uplink (UL) indication signal on an UL preconfigured resource unit corresponding to an UL indication signal transmission occasion, wherein the UL preconfigured resource unit is a preconfigured periodic UL transmission resource unit, and the UL indication signal comprises an UL sequence or UL data, wherein the UL preconfigured resource unit is associated with one or more downlink (DL) transmission beams;

wherein transmitting the UL indication signal on the UL preconfigured resource unit corresponding to the UL indication signal transmission occasion comprises:

transmitting the UL data on the specific UL preconfigured resource unit corresponding to the UL indication signal transmission occasion when the UL data needs to be transmitted on the UL indication signal transmission occasion.

2. The method of claim 1, wherein transmitting the UL indication signal on the UL preconfigured resource unit corresponding to the UL indication signal transmission occasion further comprises:

transmitting the UL sequence on the UL indication signal transmission occasion when the UL data needs to be transmitted on the UL indication signal transmission occasion; and the method further comprises:

receiving DL indication information; and transmitting the UL data on a general preconfigured resource in a current period.

3. The method of claim 2, wherein a period of the UL indication signal transmission occasion is (N+1) times a period of the general preconfigured resource, and N is a positive integer.

4. The method of claim 2, wherein receiving the DL indication information comprises:

receiving the DL indication information transmitted on the one or more DL transmission beams.

5. The method of claim 2, further comprising:

transmitting a random access request and switching the terminal device to a connected state, in a case where no DL indication information is received and the UL data needs to be transmitted; and transmitting the UL data in the connected state.

6. The method of claim 1, further comprising:

receiving the UL indication signal transmission occasion preconfigured, wherein the UL indication signal transmission occasion is periodic and indicates a transmission occasion for transmitting the UL indication signal.

7. The method of claim 1, wherein the UL indication signal transmission occasion comprises a plurality of UL preconfigured resource units.

8. The method of claim 1, wherein the UL indication signal transmission occasion is a start of an UL preconfigured resource window, and the UL preconfigured resource window comprises a plurality of general preconfigured resources.

9. A method for data transmission, being implemented in an access network device and comprising:

receiving, on an uplink (UL) preconfigured resource unit corresponding to an UL indication signal transmission occasion, an UL indication signal transmitted by a terminal device, wherein the terminal device is in a sleep state or an inactive state, the UL preconfigured resource unit is a preconfigured periodic UL transmission resource unit, and the UL indication signal comprises an UL sequence or UL data, wherein the UL preconfigured resource unit is associated with one or more downlink (DL) transmission beams, wherein receiving, on the UL preconfigured resource unit corresponding to the UL indication signal transmission occasion, the UL indication signal transmitted by the terminal device comprises: receiving, on the UL indication signal transmission occasion, the UL sequence transmitted by the terminal device, and the method further comprises:

transmitting DL indication information; and receiving, on a general preconfigured resource in a current period, the UL data transmitted by the terminal device.

10. The method of claim 9, wherein receiving, on the UL preconfigured resource unit corresponding to the UL indication signal transmission occasion, the UL indication signal transmitted by the terminal device further comprises:

receiving, on the specific UL preconfigured resource unit corresponding to the UL indication signal transmission occasion, the UL data transmitted by the terminal device.

11. The method of claim 9, wherein a period of the UL indication signal transmission occasion is (N+1) times a period of the general preconfigured resource, and N is a positive integer.

12. The method of claim 9, wherein transmitting the DL indication information comprises:

transmitting the DL indication information on the one or more DL transmission beams.

13. The method of claim 9, further comprising:

skipping responding after receiving, on the UL indication signal transmission occasion, the UL sequence transmitted by the terminal device; and receiving the UL data transmitted by the terminal device in a connected state after receiving a random access request transmitted by the terminal device.

14. The method of claim 9, further comprising:

transmitting the UL indication signal transmission occasion preconfigured, wherein the UL indication signal transmission occasion is periodic and indicates a transmission occasion for transmitting the UL indication signal.

15. The method of claim 9, wherein the UL indication signal transmission occasion comprises a plurality of UL preconfigured resource units.

16. A terminal device, being in a sleep state or an inactive state and comprising:

a memory configured to store processor executable instructions; and a processor configured to:

transmit an uplink (UL) indication signal on an UL preconfigured resource unit, wherein the UL preconfigured resource unit is a preconfigured periodic UL transmission resource unit corresponding to an UL indication signal transmission occasion, and the UL indication signal comprises an UL sequence or UL data, wherein the UL preconfigured resource unit is associated with one or more downlink (DL) transmission beams, wherein in terms of transmitting the UL indication signal on the UL preconfigured resource unit corresponding to the UL indication signal transmission occasion, the processor is configured to:

transmit the UL data on the specific UL preconfigured resource unit corresponding to the UL indication signal transmission occasion when the UL data needs to be transmitted on the UL indication signal transmission occasion.

* * * * *